US005703555A

United States Patent [19]
McCann

[11] Patent Number: 5,703,555
[45] Date of Patent: Dec. 30, 1997

[54] ROTARY ACTUATOR

[75] Inventor: Roy A. McCann, Kettering, Ohio

[73] Assignee: ITT Automotive Electrical Systems Inc., Auburn Hills, Mich.

[21] Appl. No.: 427,777

[22] Filed: Apr. 25, 1995

[51] Int. Cl.$^6$ ....................................................... H01F 7/08
[52] U.S. Cl. ............................................ 335/272; 310/40 R
[58] Field of Search ................................. 335/272, 279, 335/273; 310/40 R, 46, 152, 154, 156, 261, 268

[56] References Cited

U.S. PATENT DOCUMENTS

| 3,501,726 | 3/1970 | Olesen | 335/272 |
| 4,806,837 | 2/1989 | Ito | 318/653 |
| 5,512,871 | 4/1996 | Oudet et al. | 335/220 |

*Primary Examiner*—Lincoln Donovan
*Attorney, Agent, or Firm*—J. Gordon Lewis; Thomas N. Twomey

[57] ABSTRACT

A rotary actuator includes a pole riser that acts as a mechanical stop and provides advantageous magnetic latching features, which overcome the problems typically associated with the end of travel in conventional rotary actuators. The pole riser designed in accordance with this invention includes a necked region of reduced cross-sectional area, which allows for an air gap to be maintained between at least a portion of the pole riser and the rotor pole at the end of travel. The pole riser necked region provides an additional flux pathway that is magnetically saturated and the remainder of the pole riser provides a magnetic pathway for a latching flux, which maintains the rotor in an end of travel position without requiring an increase in the current through the coil. A rotary actuator design and control methodology are disclosed.

21 Claims, 1 Drawing Sheet

ROTARY ACTUATOR

BACKGROUND OF THE INVENTION

1. Field of the Invention

This invention generally relates to a rotary actuator including an end of travel magnetic latching system. More particularly, this invention relates to a limited rotation axial air-gap, reluctance type actuator including a pole riser that facilitates end of travel magnetic latching.

2. Description of the Prior Art

Typical rotary actuators include a rotor that is free to rotate about an axis. A pair of stator pole pieces are provided on either side of the rotor. A coil is typically provided that acts as a source of a magnetomotive force, which causes the rotor to rotate because a magnetic field is created when the coil is energized. A torque is produced on the rotor causing it to rotate because of the tendency of the machine to seek a minimum reluctance position. A minimum reluctance position corresponds to the rotor being aligned with the stator pole faces. In general, the reluctance of a magnetic circuit of air and highly permeable iron, which is a typical material used for rotors and stator pole pieces, is proportional to the air-gap length parallel to the magnetic flux direction, and is inversely proportional to the cross-sectional area of the pieces of permeable iron.

In this general manner, therefore, a rotor is rotated from an initial position wherein the rotor poles are not aligned with the stator pole pieces. Energizing the coil introduces a magnetic field that causes the rotor to align with the stator pole pieces such that a minimum reluctance condition is achieved. In rotary type solenoids and torquer motors, the rotor is only rotated along a limited arcuate path. The furthest point of rotation in the rotor is commonly known as the end of travel.

Conventional rotary-type solenoids and torquer motors are used in a variety of applications, which include the control of automobile subsystems. Such conventional devices have a major shortcoming in that there is a reduced torque capability at constant current near the end of travel of the rotor within the device. This reduced torque capability is caused by undesirable leakage and stray magnetic fields, which include "fringing" effects. The undesirable leakage and stray magnetic fields become more pronounced at the end of travel. Conventional attempts to compensate for this reduced torque capability include the use of an increased holding current at or near the end of travel. A significant drawback associated with the increased holding current is that the heat dissipation of the motor is greatly and undesirably increased.

In view of the just described shortcomings and drawbacks, it is desirable to provide a rotary actuator design that does not suffer from a reduced torque capability at constant current near end of travel. Further, it is desirable to provide a rotary actuator design that does not require an increased holding current near or at the end of travel in order to avoid increasing the heat dissipation load of the motor.

Accordingly, this invention provides a rotary actuator design that includes an end of travel magnetic latching feature. This invention includes a pole riser that serves as a mechanical stop or end of travel locator for the rotor. The specific pole riser design according to this invention increases the torque of the rotary actuator near the end of travel. This invention also provides a magnetic latch feature, which reduces the holding current requirements near the end of travel, and improves the thermal characteristics of the device.

SUMMARY OF THE INVENTION

In most general terms, the rotary actuator of this invention includes a rotor that is rotatable about a central axis. Two stator poles are generally aligned along the central axis and are disposed on opposite sides of the rotor. The stator poles are stationary about the axis, while the rotor is capable of rotating about the axis.

A pole riser is connected to at least one of the stator poles. The pole riser is positioned to abut a portion of the rotor when the rotor rotates to a preselected stop position relative to the stator poles. A coil is disposed about the rotor and is energizable to generate a magnetomotive force that travels along a main flux path and causes the rotor to rotate about the central axis.

In a preferred embodiment, a biasing means, such as a spring, is provided for urging the rotor into a preselected rest position when the coil is not energized.

In the preferred embodiment, the pole riser projects axially away from the face of the stator pole such that the pole riser acts as a spacer between the stator poles, which are placed on opposite sides of the rotor. The pole riser has a configuration that provides two magnetic flux paths in addition to the main flux path. In the preferred embodiment, the rotor, coil, stator poles and the pole riser are all disposed within a generally cylindrical cap that acts as a return magnetic flux path, which completes a loop along the main and two additional flux paths, respectively. The pole riser preferably has a configuration that includes a necked region of reduced cross-sectional area, which is magnetically saturated during operation of the rotary actuator.

Further features and advantages of this invention will become apparent to those skilled in the art from the following detailed description of the preferred embodiments.

DETAILED DESCRIPTION OF THE PREFERRED EMBODIMENTS

Figure 1:
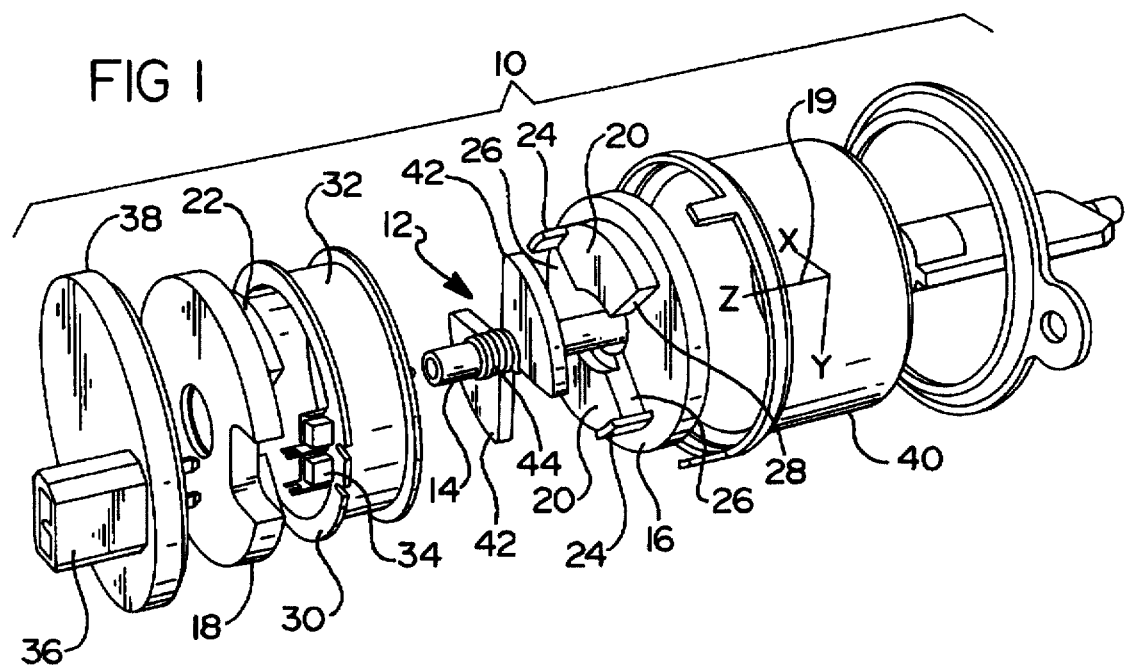
FIG. 1 is a perspective, diagrammatic exploded view of a rotary actuator designed in accordance with this invention.

FIG. 1 illustrates a rotary actuator 10 that includes rotor 12, which rotates about a central axis 19 on shaft 14. Stator piece 16 and stator piece 18 are axially aligned along central axis 19 and are disposed on either side of rotor 12. Stator pieces 16 and 18 are rotationally fixed about central axis 19. Stator piece 16 includes stator poles 20 while stator piece 18 includes stator poles 22. Stator poles 20 are radially aligned with stator poles 22 such that they are directly facing each other when rotary actuator 10 is in an assembled condition.

Pole risers 24 are provided on stator piece 16 adjacent to trailing edge 26 on stator poles 20. The edge of stator poles 20 referred to as trailing edge 26 are opposite leading edge 28. The terms leading edge and trailing edge are used because the direction of rotation of rotor 12, according to the illustration, is in a counter-clockwise direction and as the poles of rotor 12 rotate about central axis 19, they pass the leading edge 28 of the stator poles at the beginning of the rotation and approach the trailing edge 26 near the end of travel. Pole risers 24 are diagrammatically illustrated in FIG. 1. Further details of the preferred configuration of pole risers 24 will be discussed below in connection with FIG. 2. Bobbin 30 is generally cylindrical and supports coil 32. Coil 32 is an electrically energizable coil that serves as a magnetomotive force source within rotary actuator 10. Coil 32 is coupled to an outside power source through leads 34 which are adjoined with electrical coupling 36 when cap 38 is properly positioned adjacent stator piece 18. The assembled pieces of rotary actuator 10 are maintained within stator case 40, which serves as a magnetic flux "return path" as will become apparent from FIG. 2 and the discussion that follows.

During normal operation of rotary actuator 10, the rotary poles 42 are axially unaligned with stator poles 20 and 22. This unaligned position occurs when there is no magnetomotive force being applied due to an unenergized coil 32. A spring or biasing means 44 is provided to urge rotor 12 into an axially unaligned position relative to the stator poles. It is important that spring 44 does not interfere with movement of rotor 12 as caused by the magnetomotive force introduced when coil 32 is energized.

As rotor 12 rotates in a counterclockwise direction (according to the drawing), a leading edge on the rotor poles 42 will contact one side of pole risers 24, which defines the end of travel of rotor 12. In the illustrated embodiment, pole risers 24 are placed adjacent stator poles 20 and are positioned such that the end of travel occurs before a leading edge on rotor pole 42 is aligned with trailing edge 26 of stator pole 20. The exact position of pole risers 24 can be adjusted according to the particular needs of any particular embodiment, provided that the end of travel corresponds generally to an edge of the stator poles such as trailing edge 26 on stator pole 20.

Figure 2:
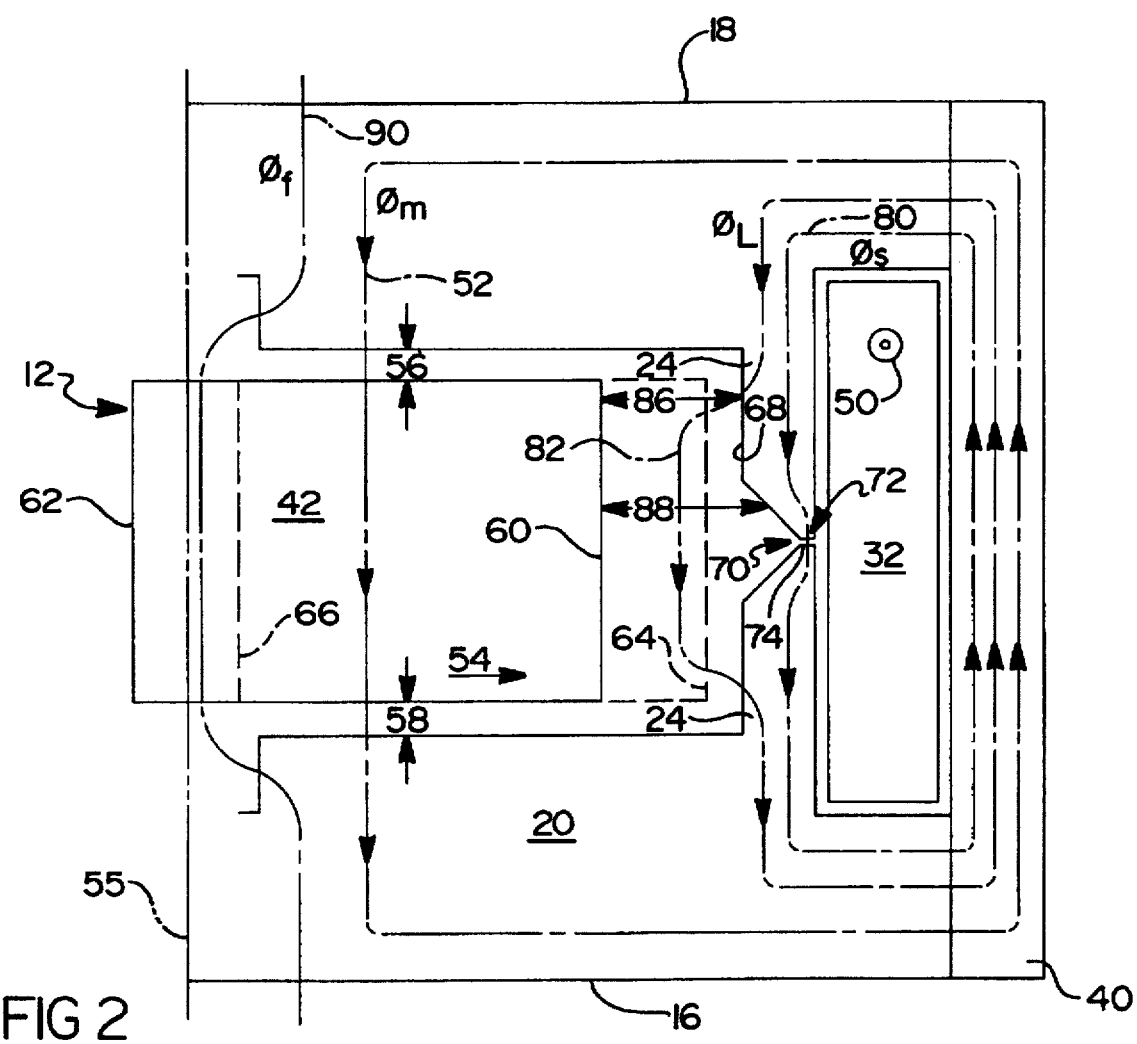
FIG. 2 is a partial cross-sectional view of selected components of a rotary actuator designed in accordance with this invention.

FIG. 2 is a cross-sectional view showing selected components of rotary actuator 10. The view illustrated in FIG. 2 would be taken in a plane generally corresponding to the -Y,Z plane shown in FIG. 1. FIG. 2 is a composite illustration showing a portion of a cylindrical surface over the outer edges of stator poles 20 and 22 and an outer surface of rotor pole 42.

An energizing current 50 is diagrammatically illustrated as coming out of the page or the plane of the drawing of FIG. 2. Energizing current 50 is the current that is propagated through coil 32, which produces a magnetic field in a counter-clockwise direction (according to the drawing). The main torque producing flux path 52 is also referred to as the $\phi_m$ pathway. The main torque producing flux, $\phi_m$, causes rotor 12 to rotate in a counter-clockwise direction according to FIG. 1, which corresponds to the direction arrow 54 in FIG. 2. Rotor 12 rotates about central axis 19. Movement of rotor 12 to the right (according to FIG. 2) occurs because, when the magnetic field is produced by the energized coil 32, the machine has a tendency to seek a minimum reluctance position. In general, the reluctance of a magnetic circuit of air in highly permeable iron is proportional to the air-gap length parallel to the magnetic flux direction, and is inversely proportional to the cross-sectional area of the permeable iron. As rotor 12 moves according to direction arrow 54, the cross-sectional area of iron to $\phi_m$ increases. The air-gaps between rotor pole 42 and stator poles 20 and 22 remain constant because of the construction of rotary actuator 10. The air-gap between rotor pole 42 and stator pole 22 is shown at 56 while the air-gap between rotor pole 42 and stator pole 20 is shown at 58.

FIG. 2 illustrates rotor 12 moving to the right (according to the drawing) such that a leading edge 60 of rotor pole 42 and a trailing edge 62 move into the positions indicated in phantom at 64 and 66, respectively. Eventually, rotor pole 42 continues toward the right until leading edge 60 makes mechanical contact with contact edge 68 on pole riser 24.

As shown in FIG. 2, pole riser 24 includes necked region 70, which has a nominal thickness 72 at a terminal face 74 of pole riser 24. It is important to note that the embodiment illustrated in FIG. 2 has a pole riser 24 extending from each stator piece 16 and 18. It is also possible to have the pole riser 24 be one piece extending from either of the two stator pieces. In either alternative, it is important to maintain a necked region 70 as generally illustrated in FIG. 2. In the embodiment illustrated in FIG. 2, terminal face 74 on each pole riser 24 is preferably placed in metal-to-metal contact when rotary actuator 10 is assembled.

Necked region 70 provides the "short-circuit" flux pathway 80, which is also referred to as the $\phi_s$ pathway. $\phi_s$ pathway 80 is one of two additional flux pathways provided by the pole riser 24 design according to this invention. The magnetic flux represented as $\phi_s$ does not produce any torque, which would have an effect on the rotation of rotor 12. Any possible negative influence of the non-torque producing flux $\phi_s$ is minimized by tapering the cross-sectional area of necked region 70. Specifically, the area having the nominal thickness 72 becomes magnetically saturated. Therefore, $\phi_s$ remains a small fraction of the total magnetic flux produced by current 50 in coil 32.

The second flux pathway that is added in accordance with this invention is the $\phi_L$ pathway 82. The flux that traverses pathway 82 is also referred to herein as the latching flux, $\phi_L$. Pathway 82 is, at least partially, radially directed through contact edge 68 on pole riser 24. That is, flux $\phi_L$ is dependent on the cross-sectional area of iron present at contact edge 68. In contrast to the torque produced by $\phi_m$, which is due to a changing iron cross-section with rotation of rotor 12, $\phi_L$ produces torque based on a change in air-gap length. As can be appreciated from the drawing, the cross-sectional area of permeable iron on rotor leading edge 60 and contact edge 68 of pole riser 24 does not change as rotor 12 rotates about its axis. However, the air-gap between the pole riser and the rotor leading edge 60 decreases as the rotor rotates according to direction arrow 54. As rotor 12 moves according to direction 54, toward the pole risers 24, the reluctance of the path is reduced.

Rotor 12 continues to rotate until rotor leading edge 60 contacts pole riser face 68. In this manner, pole riser 24 provides a mechanical rotor stop. As air-gap, indicated at 86, between rotor leading edge 60 and pole riser contact edge 68 approaches zero, the reluctance of pathway 82 becomes very low. As a result, $\phi_m$ is reduced and most of the coil current magnetomotive force is realized through $\phi_L$. This produces a relatively large "latching" torque, which tends to maintain rotor 12 in the position where rotor leading edge 60 is in contact with pole riser face 68.

A significant advantage provided by this invention is the reduction of the effects of fringing magnetic flues such as that indicated in the $\phi_f$ pathway 90. A "fringe" flux such as $\phi_f$ normally occurs as the result of the magnetic field produced by current 50 through coil 32. Flux $\phi_f$ would tend to reduce the effective change in the reluctance with rotor travel when rotor pole 42 moves toward the position indicated by phantom lines 64 and 66. Without pole risers 24, the fringe field flux $\phi_f$ would also act on the pole sides adjacent to the coil, that is rotor leading edge 60. As discussed above, as the air-gap 86 between rotor leading edge 60 and pole riser contact edge 68 become zero, the reluctance of pathway 82 becomes very small and, as a result, $\phi_f$ is reduced. Therefore, provision of the $\phi_L$ pathway 82 serves the additional purpose of reducing or eliminating the effects of fringe magnetic field fluxes.

It is important to note that although rotor leading edge 60 contacts pole riser contact edge 68, an air gap indicated at 88 still exists. This air gap is important, in part, because it forces $\phi_L$ to cross the air gap 86 between contact surface 68 and the rotor leading edge 60. This creates a varying reluctance path that creates torque near the rotor end of travel. The configuration, illustrated in FIG. 2, causes heavy saturation at region 72, thereby minimizing the effects of $\phi_r$.

The physical dimensions of surface 68 controls the amount of latching, or holding torque, provided by $\phi_L$ when air gap 86 approaches zero. At zero air gap, the reluctance associated with $\phi_L$ becomes very low, causing saturation at surface 68. The level of saturation at surface 68 determines the latching torque. The surface area of surface 68 is preferably large enough to provide the latching torque effect with a reduced current 50. A significant advantage provided by this invention is that current 50 can be significantly reduced while maintaining rotor 12 under rotated load torque. The surface area of contact surface 68 preferably is designed such that any remnant field of pole pieces 20 and 22 does not prevent a spring return of rotor 12 to an initial, unaligned position when current 50 in coil 32 goes to zero.

Therefore, in designing a rotary actuator in accordance with this invention, the pole riser must be designed to control the amount of local magnetic saturation at the pole riser. The pole-riser configuration also must not magnetically short-circuit the main stator field. This invention, therefore, includes a pole geometry such as that illustrated in FIG. 2. Modifications of the shape of the necked region are possible that do not depart from the purview of this invention provided that the necked region ensures a partial air gap between the rotor leading edge and the contact face of the pole riser as illustrated and discussed above. For example, a surface profile having a curved surface or a generally rectangular cross-section could be used. The illustrated configuration shows the presently preferred embodiment.

It is also important to choose the material for the pole riser in order to ensure the operating characteristics just described. The specific material choice will be influenced by the number of coils or coil windings that are implemented, the size of rotor 12, size of the $\phi_m$ air gap (i.e., air gaps 56 and 58 in FIG. 2) and the fact that it is desirable to have the necked region 70 magnetically saturated. Applicant has found it useful to use a sintered iron powdered metal having a density of 7.2 g/cm with 0.45% carbon. This particular material has proved useful with a typical operating range between 0 and 30 $O_e$, which corresponds to a range at the pole riser necked region of more than 100 $O_e$ and 14.5 KiloGauss.

The above description is exemplary rather than limiting in nature. Variations and modifications of the above-described embodiments will become apparent to those skilled in the art that do not depart from the purview and spirit of this invention. The scope of this invention is to be limited only by the appended claims, including all fair legal equivalents.

What is claimed is:

1. A rotary actuator, comprising:
    a rotor that is rotatable about an axis;
    two stator poles generally aligned along said axis and disposed on opposite sides of said rotor, said poles being stationary about said axis;
    a coil disposed about said rotor, said coil being energizable to thereby generate a magneto motive force that travels along a main flux path and causes said rotor to rotate about said axis; and
    a pole riser extending from at least one of said stator poles and positioned to abut a portion of said rotor when said rotor rotates to a preselected stop position, said pole riser having a configuration that provides first and second flux paths in addition to said main flux path.

2. The rotary actuator of claim 1, further comprising a biasing means for biasing said rotor into a preselected rest position when there is no magneto motive force causing said rotor to rotate.

3. The rotary actuator of claim 1, wherein a portion of said pole riser projects axially away from a face of said stator pole such that said pole riser portion is a spacer between said stator poles.

4. The rotary actuator of claim 1, wherein said first additional flux path is a latching flux path, along which a latching flux, which tends to maintain said rotor in abutting engagement with said pole riser, travels.

5. The rotary actuator of claim 1, wherein said second additional flux path is a flux path, along which a non-torque producing flux travels, said second flux path being generally parallel to said main flux path.

6. The rotary actuator of claim 1, wherein said pole riser configuration has a varying thickness with a nominal thickness at a preselected point along a length of said pole riser, said thickness increasing from said nominal thickness along some of said length and said thickness being constant along a remainder of said length.

7. The rotary actuator of claim 6, wherein said nominal thickness on said pole riser is coincident with a portion of said second flux path.

8. The rotary actuator of claim 6, wherein said remainder of said length is coincident with a portion of said first additional flux path and wherein said first additional flux path is controlled as a function of a dimension of said remainder of said length.

9. The rotary actuator of claim 6, wherein said rotor abuts against said remainder of said length of said pole riser in said preselected stop position.

10. The rotary actuator of claim 1, further comprising a second pole riser and wherein one pole riser is associated with each said stator pole.

11. The rotary actuator of claim 10, wherein said pole risers each have a first surface disposed radially toward said rotor, said first surface having a profile that defines a nominal thickness of said pole risers at a terminal face of said pole risers, a ramped surface extending axially away from said terminal face and a second face extending from said ramped surface in a direction away from said terminal face and generally parallel to said axis and wherein said pole riser terminal faces are disposed adjacent each other within said rotary actuator.

12. A pole riser for use in a rotary actuator to provide first and second additional flux paths and a mechanical stop for a rotor that rotates about an axis within the rotary actuator responsively to a magnetomotive force generated by an energizable coil, comprising:
    a nominal thickness defined at a preselected plane through said pole riser;
    a latching portion, adapted to abuttingly contact a surface on the rotor when the rotor rotates to a preselected stop position, said latching portion having a generally constant thickness, greater than said nominal thickness, along a length of said latching portion; and
    a necked region extending between said preselected plane and said latching portion, said necked region having a varying thickness increasing generally in a direction away from said preselected plane toward said latching portion.

13. The pole riser of claim 12, wherein said preselected plane defines a terminal face at one end of said pole riser.

14. The pole riser of claim 12, wherein said necked region is directly adjacent said latching portion and wherein said necked region has a length that is smaller than the length of said latching portion.

15. The pole riser of claim 12, wherein said varying thickness of said necked region increases generally linearly such that said necked region has a generally truncated triangular cross-section.

16. The pole riser of claim 12, wherein said preselected plane is defined at a midpoint along a length of said pole riser and wherein said necked region extends longitudinally away from said preselected plane in opposing directions and wherein there are two said latching portions extending from said necked region to opposite terminal ends on said pole riser.

17. The pole riser of claim 12, wherein said latching portion defines a portion of a latching flux path, along which a latching flux travels that tends to maintain the rotor in abutting contact with said latching portion.

18. The pole riser of claim 12, wherein said preselected plane and at least a portion of said necked region define a portion of a nontorque producing flux path, along which a nontorque producing torque travels, said preselected plane and said portion of said necked region being adapted to become magnetically saturated when the coil is energized.

19. A method of controlling the position of a rotor that rotates about an axis between an initial position and a preselected stop position within a rotary actuator, comprising the steps of:

(A) causing a magneto motive force to act on said rotor such that said rotor rotates away from said initial position toward said stop position by producing a main magnetic flux, which varies as a function of a rotary position of said rotor, to flow through at least a portion of said rotor in a direction generally parallel to said axis;

(B) causing a first additional magnetic flux to flow in a direction generally parallel to said axis and along a pathway radially spaced from said rotor, said first additional flux not producing any torque that acts on said rotor; and (C) causing a latching flux to flow in a direction generally perpendicular to said axis along a pathway at least partially directed generally radially toward said rotor, said latching flux increasing as said rotor rotates toward said stop position such that said latching flux introduces a magneto motive force that acts on said rotor to maintain said rotor in said preselected stop position independent of said main flux.

20. The method of claim 19, wherein step (C) is performed by the substep of causing low level magnetic saturation along at least a portion of the pathway along which the latching flux flows.

21. The rotary actuator of claim 1, further comprising a second pole riser extending from the other one of said stator poles.

* * * * *